United States Patent Office 2,804,687
Patented Sept. 3, 1957

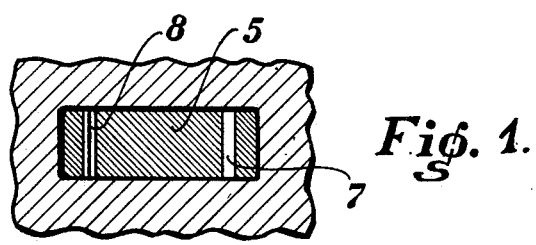
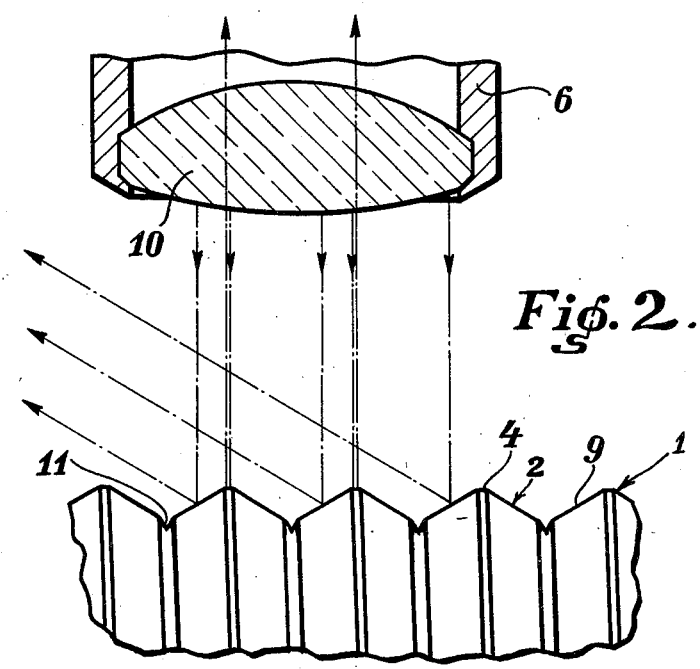

2,804,687
PRECISION MEASURING RULE

Otto Malfeld, Wetzlar, Germany, assignor to Ernst Leitz, G. m. b. H., a corporation of Germany Application August 20, 1954, Serial No. 451,215

Claims priority, application Germany August 20, 1953

4 Claims. (Cl. 33—1)

My invention relates to a precision measuring rule and more particularly to a rule in the form of a screw. In the prior art the fine thread of the screw of high quality is engraved on a highly polished cylinder. Observed by a microscope or by projection with top-light illumination small portions of the engraved thread are visible as straight dark lines which serve as measuring marks, e. g. millimeter marks. The ocular of the microscope is provided with a fine index-mark. As this mark also appears dark, it is difficult to find the exact coincidence of the said index mark with the image of a millimeter mark. It is an object of the invention to provide a threaded rule which overcomes this difficulty.

According to my invention the crests of the screw are ground to small light-reflecting surfaces.

My invention will be more easily understood by reference to the attached drawing showing, by way of example, an embodiment of the invention in which Fig. 1 shows a part of the field of view in an ocular, and Fig. 2 is a side view of a portion of a measuring screw and of an ocular embodying my invention.

On a cylinder 1 is engraved a screw 2 the crest of which is flattened to provide small light-reflecting areas 4. Before grinding the screw is blackened, only the said areas 4 becoming light reflecting.

In the field of view 5 of an ocular containing a dark mark 8, Fig. 1, bright strips 7 are visible; these strips are caused by light beams reflected on the areas 4 of the rule. The dark mark 8 can easily be set relative to the bright strips.

In the embodiment of the invention illustrated in Fig. 2 the ocular 10 is placed with its principal axis at a right angle to the axis of the screw 1, and the light is passed to the screw coaxial with the principal axis of the ocular so that light passing to the screw is reflected from the polished flattened crests 4 of the screw thread directly back through the ocular and appear as a succession of spaced light lines, such as the lines 7 of Fig. 1. The angles of the screw thread are such that light striking the sides of the screw threads are reflected sidewise and cannot pass back to the ocular. The spaces between the crests 4, therefore, do not reflect any light to the ocular and appear as dark spaces. Any angle of the screw thread greater than 90° will be satisfactory for this purpose because the light will strike the inclined surface of the screw thread at an angle greater than 45° and will be reflected at an angle greater than 45° so that it will not strike the surface of an adjacent screw thread and be reflected back, but will be reflected as indicated in the lines shown in the figure. This will ensure that only light strike the polished crests 4 will be reflected into the ocular. The ocular will be provided with a dark line 8 parallel to the reflected light from the crests so that when reflected light is brought into alignment with this line 8 as shown in Fig. 1, coincidence will be easily observable.

What I claim is:

1. A precision measuring rule which comprises a measuring screw and an optical instrument for viewing said screw in which the crests of said screw are ground to form small light reflecting areas, the spaces between said crests inclined to reflect top light outside of said optical instrument and the space between said inclined surfaces blackened.

2. The precision measuring rule of claim 3 in which said optical instrument is a microscope and in which the light reflected from said inclined surfaces is reflected outside of the objective of said microscope.

3. A precision measuring rule which comprises a measuring screw and an optical instrument for viewing said screw, the optical axis of said optical instrument being at a right angle to the axis of the screw, said optical instrument supplying light to said screw parallel to its optical axis, the crests of said screw being ground to form a thin light reflecting surface and the angle of the screw thread of said screw being greater than 90° to reflect said incident light away from the objective of said optical instrument.

4. The precision measuring rule of claim 3 in which said optical instrument has a dark line parallel to the crests of said screw so that when the reflected light is brought to coincidence with said dark line said coincidence will be readily observable.

References Cited in the file of this patent

UNITED STATES PATENTS

| 2,111,977 | Lindner | Mar. 22, 1938 |
| 2,245,133 | Hopkins | June 10, 1941 |
| 2,530,955 | Gerber | Nov. 21, 1950 |

FOREIGN PATENTS

| 333,760 | Germany | Mar. 3, 1921 |
| 876,162 | Germany | May 11, 1953 |

OTHER REFERENCES

Pages 72, 76, 77, 139 and 140 of Ground Thread Handbook, third edition, Catalog 12, Sept. 1929, John Bath & Co., 18 Grafton Street, Worcester, Mass.